US011438370B2

(12) United States Patent
Devlin et al.

(10) Patent No.: US 11,438,370 B2
(45) Date of Patent: Sep. 6, 2022

(54) EMAIL SECURITY PLATFORM

(71) Applicant: Capital One Services, LLC, McLean, VA (US)

(72) Inventors: Emmet Devlin, McLean, VA (US); Ana Cruz, Arlington, VA (US); Nahid Farhady Ghalaty, Fairfax, VA (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 225 days.

(21) Appl. No.: 16/930,731

(22) Filed: Jul. 16, 2020

(65) Prior Publication Data

US 2022/0021700 A1    Jan. 20, 2022

(51) Int. Cl.
*H04L 9/40* (2022.01)
*G06N 20/00* (2019.01)
(Continued)

(52) U.S. Cl.
CPC ......... *H04L 63/1441* (2013.01); *G06N 20/00* (2019.01); *G06Q 20/401* (2013.01); *H04B 1/38* (2013.01); *H04L 51/22* (2013.01); *H04L 51/24* (2013.01); *H04L 61/2007* (2013.01); *H04L 61/307* (2013.01); *H04L 67/306* (2013.01);
(Continued)

(58) Field of Classification Search
CPC ..... H04L 63/1441; H04L 51/22; H04L 51/24; H04L 61/2007; H04L 61/307; H04L 67/306; H04L 63/145; H04L 63/1483; H04L 67/20; H04L 63/1425; H04L 51/32; H04L 51/12; G06N 20/00; G06Q 20/401; G06Q 50/01; G06Q 20/384; G06Q 20/4015; G06Q 20/3255; G06Q 20/4016; G06Q 20/405; H04B 1/38; G06F 21/45; G06F 21/552; G06F 21/554
See application file for complete search history.

(56) References Cited

U.S. PATENT DOCUMENTS 5,461,217 A    10/1995 Claus
6,068,184 A    5/2000 Barnett
(Continued)

FOREIGN PATENT DOCUMENTS

AU    2001233511 B2    11/2006
CA    2399708 C    9/2010
(Continued)

*Primary Examiner* — Michael Won
(74) *Attorney, Agent, or Firm* — Hunton Andrews Kurth LLP

(57) ABSTRACT

A server can include a detection module for monitoring an electronic account and detecting irregular or fraudulent activities. The detection module can be a machine learning model configured to detect activities or patterns indicative of an account being compromised, hacked or accessed by unauthorized users. Upon detection of the irregular activities or patterns, the detection module can transmit a notification or signal to a trigger module which can implement remedial actions. The trigger module can receive the signal from the detection module and execute an action in accordance with a trigger plan. The trigger plan can include various information and a range of actions, which can be selected and/or executed based on the information included in the signal.

20 Claims, 6 Drawing Sheets

(51) Int. Cl.
*G06Q 20/40* (2012.01)
*H04L 51/42* (2022.01)
*H04L 67/306* (2022.01)
*H04L 61/5007* (2022.01)
*H04B 1/38* (2015.01)
*H04L 51/224* (2022.01)
*H04L 101/37* (2022.01)
*H04L 67/53* (2022.01)
*G06F 21/45* (2013.01)
*G06Q 50/00* (2012.01)

(52) U.S. Cl.
CPC ............ *G06F 21/45* (2013.01); *G06Q 50/01* (2013.01); *H04L 63/145* (2013.01); *H04L 63/1483* (2013.01); *H04L 67/20* (2013.01)

(56) References Cited

U.S. PATENT DOCUMENTS

| | | | |
|---|---|---|---|
| 6,959,873 | B2 | 11/2005 | Kayanakis et al. |
| 7,373,511 | B2 | 5/2008 | Fuchigami |
| 7,980,464 | B1 | 7/2011 | Sarris et al. |
| 9,892,293 | B1 | 2/2018 | Wade et al. |
| 10,127,409 | B1 | 11/2018 | Wade et al. |
| 10,623,233 | B1 * | 4/2020 | McConnell ............ H04L 63/08 |
| 11,227,283 | B2 * | 1/2022 | Mossoba ............... H04L 9/3213 |
| 2004/0177110 | A1 * | 9/2004 | Rounthwaite ........... H04L 51/12 709/202 |
| 2006/0032909 | A1 | 2/2006 | Seegar |
| 2006/0081700 | A1 | 4/2006 | Li |
| 2009/0164373 | A1 | 6/2009 | Blythe |
| 2009/0283586 | A1 | 11/2009 | Cecere |
| 2014/0263624 | A1 | 9/2014 | Guillaud |
| 2014/0279555 | A1 | 9/2014 | Guillaud |
| 2016/0148194 | A1 | 5/2016 | Guillaud et al. |
| 2016/0253498 | A1 * | 9/2016 | Valencia ................. G06N 20/00 726/23 |
| 2017/0200163 | A1 | 7/2017 | Davenport |
| 2018/0006989 | A1 * | 1/2018 | Dotan-Cohen ....... G06Q 10/107 |
| 2019/0260780 | A1 * | 8/2019 | Dunn ..................... G06N 20/10 |
| 2019/0319987 | A1 * | 10/2019 | Levy ...................... G06N 20/00 |
| 2020/0067861 | A1 * | 2/2020 | Leddy ................. G06Q 30/0185 |
| 2020/0396190 | A1 * | 12/2020 | Pickman ............. H04L 63/1483 |
| 2021/0056976 | A1 * | 2/2021 | Brown ..................... G10L 17/22 |
| 2021/0234827 | A1 * | 7/2021 | Waldman ........... G06Q 10/1097 |
| 2021/0374754 | A1 * | 12/2021 | Pandian .................. G06N 3/08 |

FOREIGN PATENT DOCUMENTS

| | | |
|---|---|---|
| EP | 0965109 A1 | 12/1999 |
| EP | 1865470 A1 | 12/2007 |
| EP | 2787475 A2 | 10/2014 |
| WO | 2000000923 A1 | 1/2000 |
| WO | 2001041026 A1 | 6/2001 |
| WO | 2008029141 A1 | 3/2008 |

* cited by examiner

EMAIL SECURITY PLATFORM

BACKGROUND

In this day and age, electronic messaging is a very convenient, reliable and practical mode of communication. In fact, electronic messaging has taken over the bulk of our daily communications. Electronic messaging is offered on a variety of platforms such as email platforms, social media platforms and even many financial institutions offer electronic messaging through their account platforms. On these platforms, a user can easily draft and transmit a message to another user without incurring any expense. Additionally, when the user transmits the message, the user is confident that the message and its content will be delivered to the recipient. Moreover, the message can be accessible to the sender and recipient for a long period of time, thereby the sender and the recipient can rely on the message as a record, if any proof of the message is needed. These features have made electronic messaging very popular among the users, and as a result, electronic messaging has become a crucial mode of communication.

SUMMARY

Due to the popularity of electronic messaging, these platforms have become the new focus of fraud attacks. In particular, fraudsters systematically and continuously attack individual email accounts to get access to the wealth of information stored in these accounts. There are a number of ways a hacker can illegally gain access to an email account. For example, a hacker can use a virus or phishing technique. A virus or other malware can be sent via email, and if executed may be able to capture the user's password and send it to an attacker. Phishing involves an email that appears to be from a legitimate sender but is a scam which asks for verification of personal information, such as an account number, a password, or a date of birth. If unsuspecting victims respond, the result may be stolen accounts, financial loss, or identity theft.

Fraudsters can use compromised email accounts for a variety of illicit purposes and the consequences can be devastating to the individuals and companies. For example, some fraudsters seek to blackmail the individuals and companies whose accounts have been hacked. These fraudsters gather various personal and confidential documents stored in an online account and threaten to leak them to the public. Others have spammed the contacts of the compromised account. Because usually there is an established relationship between the compromised account and the contacts, the contacts are more likely to believe in the content of these spam emails. Accordingly, spamming known contacts has a higher click rate than other types of spamming. Yet these spams can be very embarrassing for the account holder.

One fraudulent activity that has become increasingly popular lately is to exploit other accounts associated with or linked to the compromised account. In particular, once a fraudster discovers a user's email address and password, the fraudster can—almost instantly—take over the user's credentials for other email or electronic accounts. This is because many users link their electronic accounts (e.g., other email accounts, social media accounts, online banking accounts, e-commerce accounts, etc.) to their email accounts or save their usernames and passwords in their email addresses. As an example, many users own multiple email accounts (e.g., primary account and secondary accounts). When a fraudster seizes a user's primary email account, the next step for the fraudster is to take complete control over the user's online presence (and prevent the user from receiving any alerts). As such, the fraudster will attempt to take control of the remaining email accounts of the user. This can be achieved if, e.g., the fraudster resets the password for the secondary accounts and responds to password reset emails at the primary email account.

In order to minimize the harmful effects of these fraudulent activities, there needs to be an automated platform which can quickly detect at least one compromised account and subsequently take action to neutralize any impact the compromised account could have on the user's other accounts. This platform can manage a plurality of electronic accounts or financial accounts, which can be hosted by one or more service companies (e.g., one account with a first service provider and a second account with a second service provider).

In one example embodiment, a server can include a detection module for monitoring an electronic account and detecting irregular or fraudulent activities. The detection module can be a machine learning model configured to detect activities or patterns indicative of an account being compromised, hacked or accessed by unauthorized users. Upon detection of the irregular activities or patterns, the detection module can transmit a notification or signal to a trigger module which can implement remedial actions.

The trigger module can receive the signal from the detection module and execute an action in accordance with a trigger plan or strategy. The trigger plan can include various information and a range of actions, which can be selected and/or executed based on the information included in the signal.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

In one example embodiment, a server can include a detection module ("module") for monitoring a feed for an account (or a plurality of accounts) and detecting irregular activities or patterns in the feed. The detection module can be a machine learning model configured to detect activities or patterns indicative of an account being compromised, hacked or accessed by unauthorized users. Upon detection of the irregular activities or patterns, the detection module can transmit a notification or signal to a trigger module which can implement remedial actions. Additionally, or alternatively, the server can have access to one or more databases which store electronic messages (or data) associated with a plurality of accounts. The detection module can analyze the electronic messages and determine that one or more accounts have been, e.g., compromised. In this disclosure the terms compromised, hacked or accessed by unauthorized users may be used interchangeably.

Figure 1:
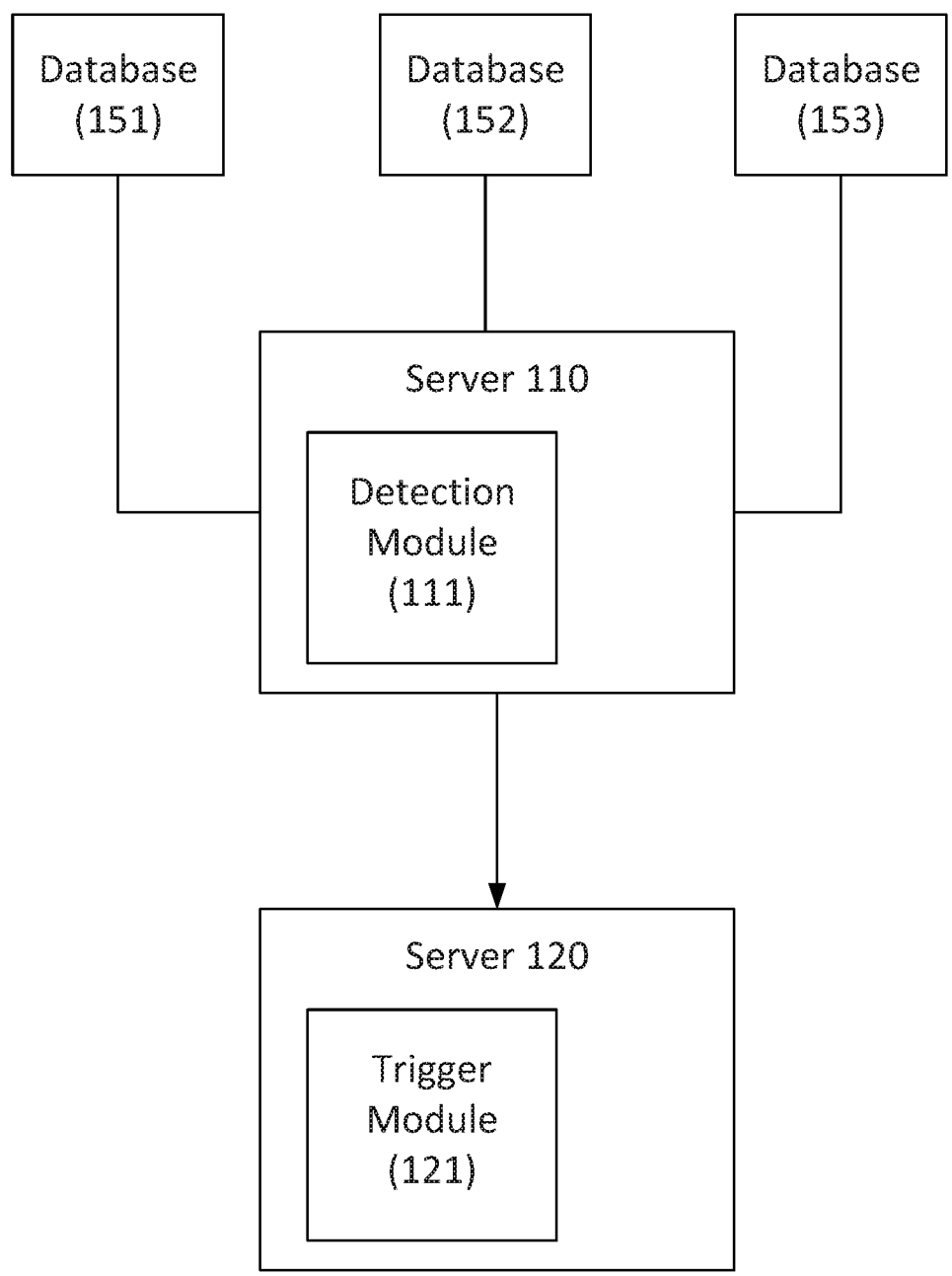
FIG. 1 shows an example system including a detection module and a trigger module.

FIG. 1 shows an example system 100 including a detection module 111 and a trigger module 121. In this example embodiment, the detection module 111 is on a server 110 and the trigger module 121 is on a server 120. Alternatively, the detection module 110 and the trigger module 120 can be located on the same server or computer network. The detection module 110 can monitor various electronic accounts by analyzing records on databases 151-153. These databases 151-153 can be associated with the server 110, or they can be independent of server 110.

In one example embodiment, the detection module can monitor incoming and outgoing emails for an email account (or a plurality of email accounts) and based on an attribute of some or all of the emails sent from or received at the email account (or the plurality of email accounts), determine whether the email account (or any of the plurality of email accounts) is compromised or hacked. For example, an unauthorized user may access a first email account and transmit five emails to the contacts stored on the first email account. Each email could be transmitted to 3 contacts (or 15 contacts total). The body of each email could include the phrase "check this out!" and a link to an online store (known for fraudulent activity). The detection module can classify the email account as compromised.

As another example, an email server can detect that a plurality of email accounts receive a plurality of emails, all from the one email address (which may not be located on the same email server as the plurality of email accounts) within a short period of time. All emails may include or share the same attribute(s), e.g., the phrase "check this out!" and a link to an online store (known for fraudulent activity). The detection module can classify the sender as compromised. In making this classification, the detection module can have access to a list of fraudulent websites and links.

In one example embodiment, the detection module can consider an attribute of an email or email account when classifying the email account as hacked or compromised. The attribute can be, e.g., the number and frequency of emails sent from or received at the email account (or other email accounts from the email account) over a specified period of time; the data or metadata included in each email, e.g., sender address, recipient address, attachment, subject line, the length of the email body and whether or not the email body includes a particular concept or topic as determined by a natural language processing module, or a link; past emails sent from or received at the email account (or other email accounts from the email account) and the metadata associated therewith; whether the email fits the profile of a spam email; the location or device from which the email account is accessed; the time when the email account is accessed or the emails were transmitted or received; or the number of failed attempts to access the email account over a specified period of time.

For example, a compromised email account is likely to be used to send a lot of spam emails in a short period of time, e.g., half an hour. All of these emails may have identical content, e.g., body of email and attachments. As another example, a compromised email account might be used to reset the passwords of other accounts linked to the email account. As such, a compromised email account might receive a lot of emails relating to resetting of the password for the accounts linked to the email account. If the number of these reset emails exceed a threshold value, the detection module can classify the account as being compromised. The threshold number can be assigned based on a machine learning prediction. As another example, most emails with a subject line including the words lottery and winner are spam emails, and the detection module can learn these words and classify the emails accordingly. As yet another example, most emails describing the recipient being the beneficiary of an inheritance worth millions of dollars are spam. These emails describe the same general concepts, which can be detected using a natural language processing detection module. As yet another example, past emails transmitted from an email account can establish patterns of email communication for the user. The detection module can determine the likely contacts for the user, the contacts which were included in the same emails, and the user's contacts for specific topics, e.g., financial topics, family topics, professional topics, etc. In other words, the detection module can determine a user's likely circles and the topics for which the user contacts these circles. The detection module can rely on a natural language processing technique to determine the topic of these emails. As yet another example, for a user who lives in the US, if the email account is accessed from an international address or location, this access can indicate that the email account is being subject to unauthorized access. As yet another example, if an email account transmits and receives emails at an unusual time, the account might have been compromised. The detection module can determine the usual email times for the email based on past emails sent and received at the mailbox, e.g., a business email account only transmits emails during day time. As yet another example, if an email account is subject to too many failed attempts to access the email account, the account might be at a higher chance of being compromised. As yet another example, if an email with a particular email profile is always deleted by the recipients, the detection module can determine that emails with this profile are junk mail. If one account is used to transmit junk emails to the user's social circles, the detection module can detect that the email account is likely compromised. In these examples, the detection module can utilize a machine learning technique to determine patterns of fraudulent activity and trigger an action when these patterns are detected. For example, the machine learning module can analyze past emails in the user's account and other accounts to detect these patterns.

The detection module can determine that an account is linked to an email account by analyzing past emails received at the email account. For example, the detection module can determine that an online banking account is linked to the email account if the email account receives monthly or annual emails from the online banking website, e.g., bank statements, privacy statements and surveys. As another example, the detection module can determine that a social media account is linked to the email account if the email account has received a welcome email or a password reset email from the social media platform. The detection module can utilize a machine learning model to make this determination. The model can be trained using labelled data across many email accounts. The labelled data can include raw emails and labelled emails.

In one example embodiment, the detection module can ascertain whether a dummy folder, a dummy photo, a dummy file, a dummy electronic message or a dummy electronic indicia has been accessed to determine whether an electronic account has been compromised. For example, an email account can include a message entitled "passwords" and saved in a folder entitled "online accounts." This message can include an attachment named "passwords file." If the detection module determines that the message, the folder or the file has been accessed or forwarded to another email address, the detection module can determine that the email account is compromised. In this example embodiment, the user can set the folder, message or attachment as dummy, and the user's preference can be stored in a database accessible by the detection module. As another example, a detection module can assign a folder, a message or an attachment as dummy based on a user's interaction with the email account. For example, if a user does not access the folder, the message or the attachment for a period of time longer than a threshold time and the folder, the message or the attachment includes one of the following words, e.g., password, account, or secret, the detection module can determine that the folder, the message or the attachment is dummy.

In one example embodiment, the detection module can consider an attribute of another electronic message or electronic account when classifying the email account as hacked or compromised. For example, the detection module can have access to a social media platform (or electronic messages associated therewith), and based on an activity associated with the user account on the social media, the detection module can determine that the user's email account is compromised. As an example, if the social media account posts a dummy photo stored on the email account or transmits the dummy photo in a message, the detection module can determine that both the email account and the social media are compromised.

In one example embodiment, the detection module can monitor a social media account on a social media platform, and based on the account's activity, the detection module can determine that the social media account is compromised. In one example, the detection module can have access to the account's past activity on the platform and ascertain various patterns for the user of the account. Based on these patterns, the detection module can create a profile for the account, and if the user's behavior deviates from the established profile, the detection module can determine that the account is compromised. For example, the detection module can classify the user's "friends" into various classes, e.g., high, medium and low, each class representing a level of interaction between the user and the "friends" in the class. If the user suddenly starts interacting with several "friends" from the "low" class, the detection module can determine that the account is compromised. As another example, the detection module can determine subjects of interest for the user of the account, e.g., subjects that user "likes" or about which the user posts on the platform. These subjects can include, e.g., politics and economics. If the user suddenly starts posting about a discount for a product and sending messages to the user's "friends" in the "low" class, the detection module can determine that the account is compromised. As yet another example, the detection module can determine a frequency of contact for a social media account. If the account starts transmitting posts and messages at a rate significantly higher than the frequency of contact, the detection module can determine that the account is compromised. In one example, the detection module can monitor a plurality of social media accounts. If these accounts start receiving messages, posts or tags from a suspected account that do not fit the profile of the suspected account, the detection module can determine that the suspected social media account is compromised.

In one example embodiment, the detection module can monitor a transaction feed of a financial account (or a plurality of financial accounts), and based on the one or more transactions that appear on the transaction feed, the detection module can determine that the account is hacked, compromised, stolen or used by unauthorized individuals (these terms may be used interchangeably in this disclosure). Additionally, or alternatively, the detection module can access one or more databases including transaction information for one or more financial accounts. The detection module can make the determination by accessing the one or more databases and analyzing the data.

The detection module can have access to past transaction data for the account, and based on this information, the detection module can develop a likely transaction profile for the account. For example, the likely transaction profile can include likely amounts, types, times and locations for purchases of the user of the account. The detection module can be a machine learning model trained using the past transaction data. When the detection module receives a notification of a new transaction, e.g., through the feed, the detection module can determine whether the transaction fits the profile of the likely transactions (i.e., make a prediction of likelihood of the transaction fitting the profile). If the transaction does not fit the profile, the detection module can determine that the account is stolen.

In one example embodiment, each account can be associated with a forbidden transaction profile. The detection module can determine that an account is stolen if, e.g., the account is used for a transaction that fits the forbidden transaction profile. For example, a user of an account can define gas purchases as forbidden transactions. Thus, if the account is used for forbidden transactions, the detection module can determine that the account is stolen. In another example, a detection module can analyze the account's transactions for a threshold period of time, and based on this analysis, determine the forbidden transaction profile. For example, the forbidden transaction profile includes transactions and transaction types for which the account has not been used for the past five years. In one example, the forbidden transaction profile can include transaction amounts, types, times and locations for purchases that would indicate the account is stolen. The profile can be user defined or created by the detection module using a machine learning technique.

In one example embodiment, the detection module can have access to other accounts for creating the likely transaction profile and determining whether a transaction fits the likely transaction profile. For example, the detection module can use data from a user's email account and social media account to create the likely transaction profile. These accounts can provide the detection module with information such as itemized receipts, prices per items, shipping charges and addresses, user's interaction with ads on social media platforms, user's location at the time of purchase, user's demographic information obtained from a social media account, etc. In one example, the likely transaction profile is generated based on past transaction information as well as information obtained from a user's email and social media account. If a transaction appears on the user's financial account that does not fit the profile, the detection module can determine that the user's financial account is stolen.

For example, the likely transaction profile can indicate that the user of the account never purchases a product at a high end stored or a product priced over $1,000. If the detection module receives two transactions from two high end stores, each priced over $2,000, the detection module can determine that these transactions do not fit the profit, and thus, the financial account is probably stolen. As another example, if the social media account of a user indicates that the user is traveling (e.g., posting from a remote location), but the user's card is used at a local store which the user never has visited, then the detection module can determine that the financial account is stolen. As another example, the likely transaction profile can indicate a frequent sequence of use for various financial accounts. The detection module can transmit a signal if the financial accounts are used in a manner contrary to this sequence. As another example, the likely transaction profile can indicate that the user never uses more than two cards within a period of an hour. If several of the users' accounts are used within a short period of time, the detection module can transmit a signal.

In one example embodiment, the detection module can monitor email traffic, text messages or cellphone notifications and determine that a financial account is compromised. For example, when a financial account is suspected of being stolen, the financial institution can transmit various email alerts, text messages or notifications to the owner of the account. Upon detecting these alerts, the detection module can transmit a signal to the trigger module to trigger an action.

In one example embodiment, the detection module can be located on a first platform, e.g., server or cluster of computers, and the one or more electronic accounts can also be located on the same platform. In another example embodiment, the detection module can be located on a first platform, but at least one of the electronic accounts can be located on a second platform. In one example, the detection module can have access to a database on the second platform such that the detection module can retrieve electronic communication data or financial transaction data from the second platform. In another example, the second platform can provide the first platform with electronic communication data or financial transaction data.

Figure 2:
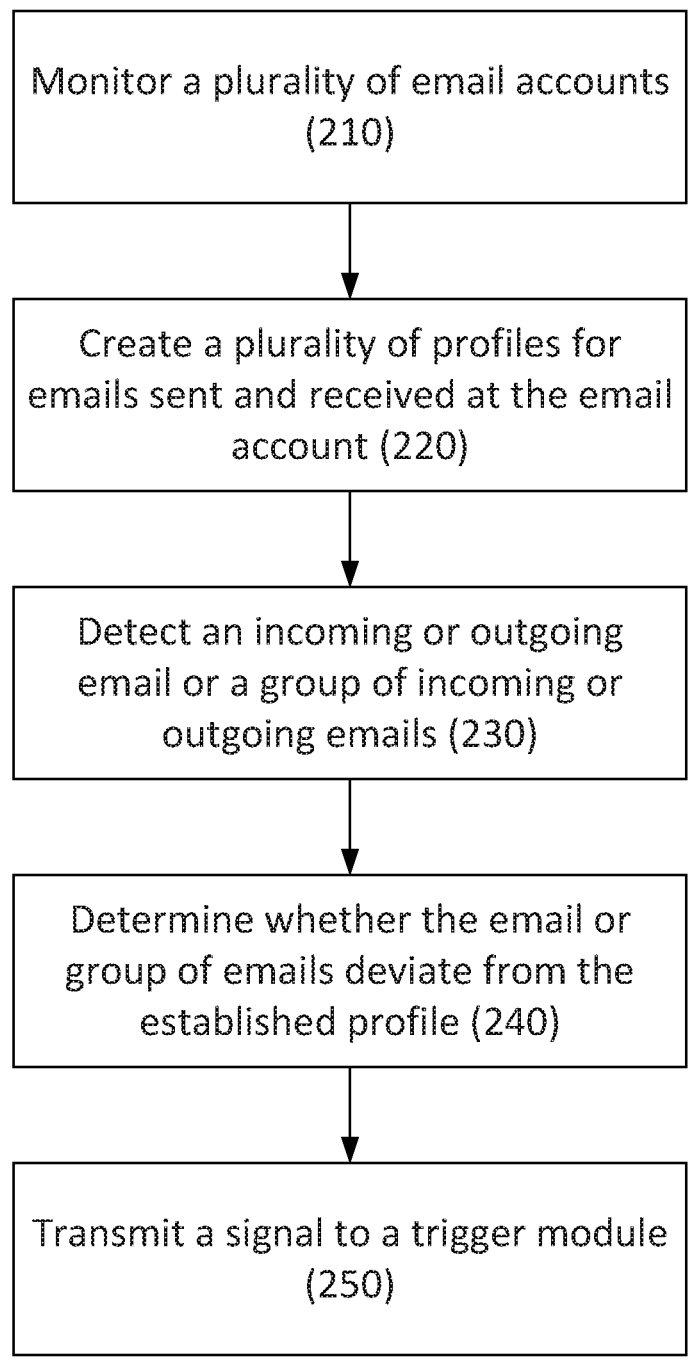
FIG. 2 shows an example flow chart for detecting a compromised electronic account.

FIG. 2 shows an example flow chart for detecting a compromised electronic account. In this example, in step 210, a detection module can monitor the electronic message activity in a plurality of electronics accounts. The electronic messages can be emails, file uploads or downloads, social media posts, social media likes, profile visits, social media messages, financial transactions, text messages, etc. The electronic accounts can be email accounts, social media accounts, social media accounts and phone accounts.

In step 220, the detection module can create a profile of a typical activity for one or more electronic accounts. For example, the detection module can establish circles of contacts with which a user of an electronic account is in frequent contact. Additionally, the detection module can establish typical subjects about which the user communicates with these contacts. As another example, the profile can be a financial profile, e.g., typical transactions, locations for transactions and purchase items. The detection module can store the profile in a database of the system.

In step 230, the module can detect an incoming or outgoing electronic message. For example, the module can detect an outgoing email or a financial transaction. There are a plurality means by which the module can detect an incoming or outgoing electronic message. For example, the module can access a database storing the electronic messages, e.g., emails, or metadata about the electronic messages, e.g., recipient addresses and transmission times. As another example, the module can analyze a live feed of data including the electronic messages, e.g., a credit card transaction feed.

In step 240, the module can compare the incoming or outgoing electronic message with the profile established in step 230. For example, if an outgoing email fits the profile of a spam email, the module can determine that the outgoing email does not fit the profile of a typical email for the email account. As another example, if a financial transaction exceeds the typical transaction value for a credit card account, the module can determine that the transaction does not fit the profile of a typical transaction for the account.

In step 250, the module can transmit a signal to a trigger module. The trigger module can trigger a predefined trigger action in response to receiving the signal. For example, if fraudulent activity is detected in a primary email account, the trigger module can initiate a password reset at a plurality of email accounts linked to the primary email account. As another example, if a fraudulent credit card transaction is detected, the trigger module can trigger suspension of a plurality of bank accounts and a password reset of an email account.

The data contained in the databases 151-153 can be used to train a predictive model (e.g., detection module 111) to determine whether an electronic account is compromised.

In one example embodiment, upon making a detection at the detection module 111, the detection module 111 can transmit a message to a user of the electronic account to receive feedback or verification about the prediction. For example, if the detection module 111 determines that the plurality of emails that were transmitted from an email account were out of character for the email account, prior to (or after) transmitting a signal to the trigger module 121, the detection module 111 can transmit a notification to the user of the email account. The notification can include details about the emails, e.g., transmission time and recipient email addresses. The user can inform the detection module, e.g., whether the user wrote the emails or whether the module's prediction is accurate. The notification module can use this response as positive or negative reinforcement for the initial prediction.

Through the accumulation of the data in the databases 151-153 and/or the feedback provided by all users of the system, the predictive model can be trained. The predictive model can be a predictive modeling framework developed by machine learning. In an embodiment, the predictive model can be a supervised learning model with a specified target and features. The target of the model can be whether an electronic account is compromised. The features of the model can be selected from the data stored in the databases 151-153, including electronic message and feedback data provided by the user. In addition, the data used for training the predictive model can increase, can decrease, or can otherwise be modified over time as the development of the predictive model continues. In some examples, the predictive model can develop profiles and behavior patterns associated with one or more electronic accounts.

In some examples, the databases can contain information relating to the use of one or more of the electronic accounts and/or client devices used by the user. Including information from the use of multiple accounts (and/or client devices) can improve the training and operation of the predictive model by providing additional insight into the form of the user's interactions with different accounts. In some examples, the databases can contain information aggregated from one or more different users and/or one or more different accounts (and/or client devices). By doing so, the initial training and operation of the predictive model can be quicker and subsequently improved as additional data is collected relating to the particular user of the accounts. Further, as the collection of data relating to the particular user of the account continues, aggregated data from other users and/or other accounts can be gradually enhanced or removed from the databases. Alternatively, all aggregated data from other users and/or other accounts can be removed at one point upon reaching a threshold amount of information relating to the particular user of the account.

The predictive model can be developed by machine learning algorithms. In an embodiment, the machine learning algorithms employed can include at least one selected from the group of gradient boosting machine, logistic regression, neural networks, and a combination thereof, however, it is understood that other machine learning algorithms can be utilized. In an embodiment, the predictive model can be developed using foundational testing data generated by randomly selecting account data of users.

The predictive model can include continuous learning capabilities. In some examples, the databases can be continuously updated as new account data is collected. The new account data can be incorporated into the training of the predictive model, so that the predictive model reflects training based on account data from various points in time. For example, the training can include usage data collected from within a certain time period (e.g., the three months or the past year). As another example, the training can include only account data that has been recently collected (e.g., within the past day, week, or month).

Initially, there cannot be sufficient foundational testing data available to develop the predictive model. Accordingly, the initial model development can be performed using predetermined actions as a proxy target and account data available from other sources as features (e.g., account data collected from other users of the same or similar accounts and account data from the instant user of the same or similar accounts). By doing so, the predictive model can begin to form its understanding of user behavior. The results of this initial modeling can support the initial status of the predictive model, and the model can be continuously improved as account data from a specific user and/or newer account data becomes available.

Once trained, the predictive model can be utilized to predict whether an account is compromised. For example, if the user transmits an email which looks like a spam email, the predictive model can determine that the email account is compromised. In response, the predictive model can transmit a signal to the trigger module.

In some examples, the predictive model can be stored on one or more local servers (i.e., the account data and the predictive model are located on local systems). Locally storing the model can realize the benefit of reduced response times where predictions and trigger signals can be more quickly issued. In other examples, the predictive model can be stored on the cloud, which can allow for centralized maintenance of the predictive model and greater accessibility of the model for training. In examples where the predictive model is locally stored, the predictive model can be trained on the cloud and synchronized across the local servers. Alternatively, the predictive model can be trained continuously when locally stored and synchronized across local servers.

Natural language processing (NLP) technology is capable of processing and analyzing natural language data, which can involve speech recognition, natural language understanding, and natural language generation. The NLP module can include software which when executed by a processor can perform tasks associated with processing and analyzing natural language data. For example, the NLP module can include different submodules, such as Natural Language understanding (NLU) submodule, natural language generation (NLG) submodule, and Sentiment Analysis submodule. The NLU submodule can process incoming text and derive meaning from the text. The NLG submodule can take a meaning that is to be communicated and express that meaning in appropriate text. The Sentiment Analysis submodule can determine a polarity and topic of a text that expresses feelings or opinions.

In one example embodiment, the NLP module can identify nouns in sentences. The NLP module can also determine human names, city names, company names, etc. These nouns can be stored in a knowledge graph database. The NLP module can also determine relationships between the nouns in a sentence.

In one example embodiment, the detection module can include an NLP module. The NLP module can analyze text and determine the general subject matter(s) to which the text refers. For example, the NPL module can analyze the body of an email or social media post, and assign various words to the email or the post. In determining the profile for the electronic account and determining whether an electronic message belongs to the profile, the NLP module can analyze the content of the message and determine whether the content is similar enough to the profile. The NLP module can provide this information to the detection module when making a prediction.

In one example embodiment, a trigger module can receive a notification or a signal from a detection module and execute an action in accordance with a trigger plan or strategy. The trigger plan can include various information and a range of actions, which can be selected and/or executed based on the information included in the signal.

Figure 3:
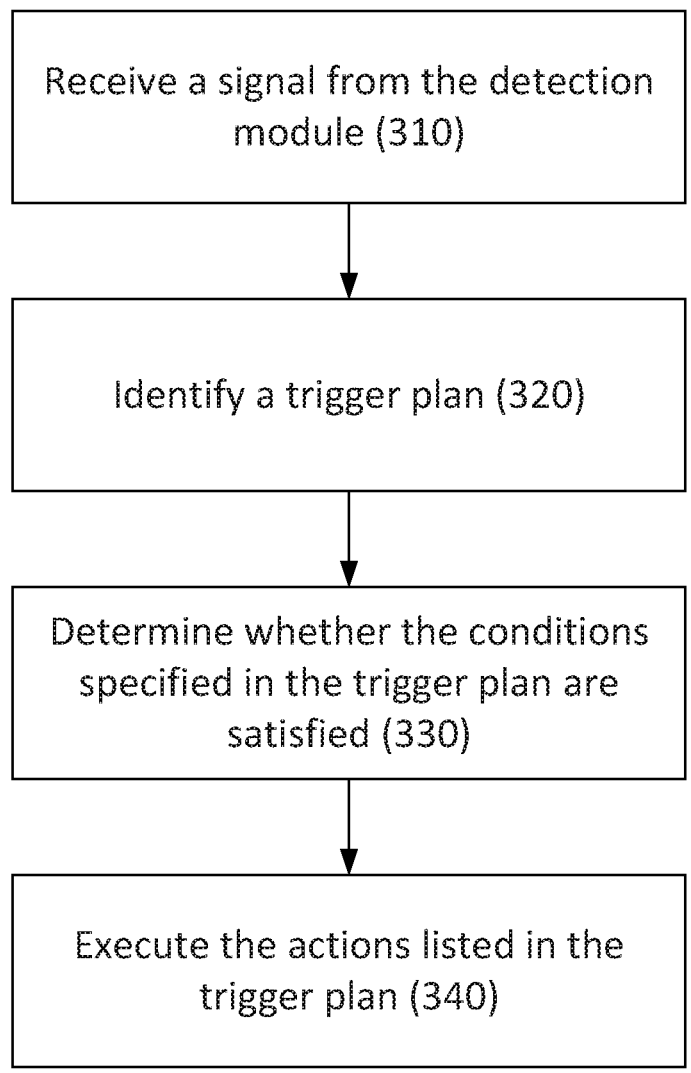
FIG. 3 shows an example flow chart for processing a signal at a trigger module.

FIG. 3 shows an example flow chart for processing a signal at a trigger module. In this example, in step 310, a trigger module can receive a signal from a detection module, e.g., an email account or a credit card is suspected of being hacked. In step 320, the trigger module can locate a trigger plan associated with the trigger module, e.g., based on the information included in the signal. For example, the trigger plan can require resetting a password for the email account or freezing the credit card if a signal is received during daytime. In step 330, the trigger module can determine if it satisfies one or more conditions included in the trigger plan, e.g., the trigger module can determine if the signal is received during daytime. If the conditions are satisfied, in step 340, the trigger module can execute the actions listed in the trigger plan, e.g., cause resetting the password for the email account or freezing the credit card.

In one example embodiment, the trigger plan can include actions such as cancelation of an electronic account; cancelation of related or linked accounts; resetting a password for an electronic account; resetting a password for a related electronic account; suspending or freezing an electronic account; and/or suspending or freezing a related electronic account. For example, in response to receiving a signal indicating that an email account is likely hacked, the trigger module can initiate a password reset for a social media account and freezing a credit card account.

In one example embodiment, an electronic account can have a general purpose password and a special purpose password. When a trigger module transmits a signal to a server hosting the account, the server can suspend the account by switching the account to a mode in which it only responds to the special purpose password. For example, in a first mode of operation, an electronic account can be accessed by a user only when the user enters a general purpose password. In a second mode of operation, the electronic account can be accessed by the user only when the user enters a special purpose password. In this example, when the server hosting the electronic account receives a trigger signal, the server only allows access to the account if the user provides the special purpose password.

In one example embodiment, the trigger plan can include a step or action for confirming whether another more aggressive action should take place. For example, the trigger plan can include requesting an email or text confirmation that the user's account should be suspended. If the user responds within a predetermined threshold time, no further action will be taken. Otherwise, the trigger module can escalate the situation by taking further action, e.g., suspending a plurality of accounts. The predetermined threshold time can be determined based on, e.g., an average time it takes for a hacker to infiltrate other accounts. A machine learning module can analyze past hacking data and make a determination as to how much time it takes on average to infiltrate a plurality of accounts after the first account is compromised. Based on this determination, the machine learning module can set the predetermined threshold time.

In one example embodiment, the trigger plan can include one or more lists of electronic accounts to be acted on based on a signal (e.g., a list of linked accounts). Each list can include an identification code associated with one or more electronic accounts, e.g., the primary email address or a name. In one example, the detection module can decide the list of accounts linked with an electronic account. The detection module can transmit this list to the trigger module, which can add the list to the trigger plan or the detection module can add the list to the trigger plan (or store the list in association with the trigger plan). For example, a list can include three email accounts and a credit card account. The list can also include a name of the owner of the email accounts and the credit card account. The trigger module can receive a signal from the detection module which includes the name of the user and the primary email address used by the user. The trigger module can locate the trigger plan associated with the user's name and act on the accounts listed on the trigger plan.

In one example embodiment, the list can include one or more financial accounts. For example, the list can include one or more credit card accounts, one or more bank accounts, one or more cryptocurrency accounts, one or more digital wallets, etc. In one example embodiment, a user can provide the list of accounts, e.g., the user can manually provide the list and the list can be stored in a database. In another example embodiment, the detection module can scan a user's credit report and compile the list of financial accounts, e.g., all or some of the reported accounts, each account having been used once or frequently since a year ago. As another example, the detection module can analyze a list of past transactions for the user and generate the list by determining a correlation between various transactions. The list can include, e.g., the cards that are frequently used or usually used together. For example, the list can include the cards that the user uses frequently, e.g., twice a week. As another example, the list can include complementary cards, i.e., cards that are used together. For a user who uses a first card for gas transactions and a second card for grocery transactions, the list can include both the first card and the second card because the user uses these cards together. As another example, the list can include the cards that the user uses for various frequently purchased categories of products and services, e.g., food and transportation tickets. As yet another example, the list can include various types of financial accounts, each account being a frequently used account, e.g., a frequently used credit card and a frequently used bank account.

In one example, each list or trigger plan can include one or more conditions which can indicate when the trigger plan can be invoked. For example, a trigger plan can require the trigger module to act only if a time condition is satisfied. In one example, a first trigger plan can be acted on only during daytime and a second trigger plan can be acted on only during night time. Therefore, if a trigger module receives a signal during daytime, the module is going to execute the first trigger plan, but if the module receives the signal during night time, the module is going to execute the second trigger plan.

In one example embodiment, the trigger plan can include a counter and the trigger module can trigger an action based on the counter number. For example, the trigger module can execute the trigger plan only if the counter exceeds a threshold number. In this example, each time the trigger module receives a signal relating to the trigger plan, the trigger plan can increment the counter until the threshold number is reached. Once the counter exceeds the threshold number, the trigger module can execute the trigger plan. In one example embodiment, the counter can be reset to zero periodically, e.g., after passage of a period of time.

In one example embodiment, the signal can include various information which can be used by the trigger module to determine which trigger plan to execute and/or whether various conditions for executing the trigger plan are satisfied. In one example, the signal can include a name or other personally identifiable information. Each trigger plan can include at least a name and/or personally identifiable information and the trigger module can locate a trigger plan based on this information. In another example, a signal can include at least one identification relating to an electronic account, e.g., email address, account number, phone number, etc. In another example, a signal can include a list of related electronic accounts. In another example, a signal can include a time when the suspected activity is detected. In another example, a signal can be a hash of the personally identifiable information and the time when the suspected activity occurred. In another example, the signal can include a counter indicating whether the signal was transmitted before, e.g., twice before.

Figure 4:
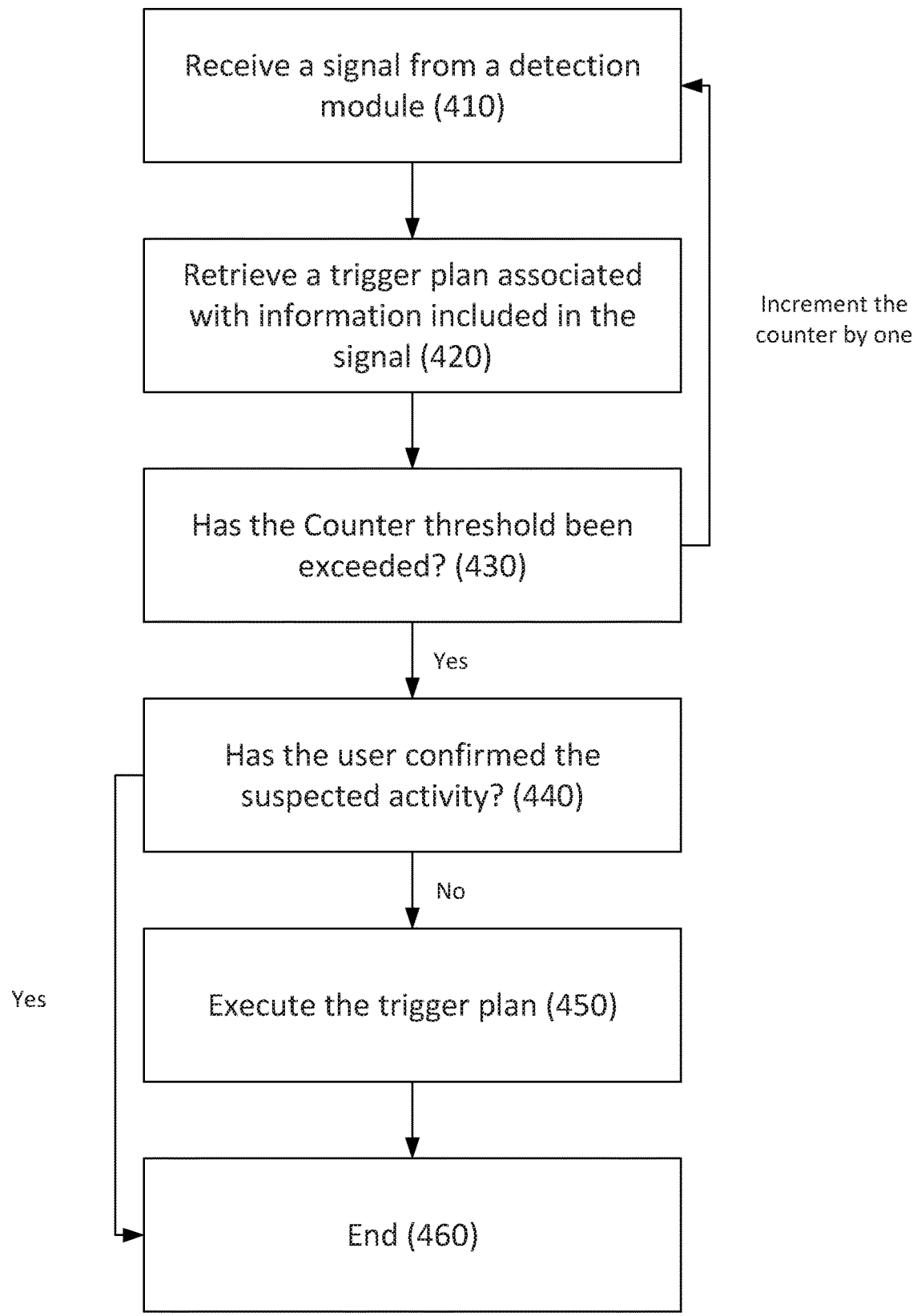
FIG. 4 shows another example flow chart for processing a signal at the trigger module.

FIG. 4 shows another example flow chart for processing a signal at the trigger module. In this example embodiment, in step 410, a trigger module can receive a signal from a detection module. The signal can indicate that a fraudulent transaction is detected in a credit card account. The signal can include the name of the credit card account holder, the credit card number and the time for the fraudulent transaction. The signal can also include information about the transaction.

In step 420, the trigger module can retrieve a trigger plan associated with the name of the account holder. In this example, the trigger plan can include actions requiring freezing the credit card account as well as another credit card account which the user uses for paying for food. The detection module may have decided that these two accounts are related to each other because, e.g., the user uses them together frequently. Additionally, the trigger plan can include resetting the password for an email account. The trigger plan can also require a text message confirmation before freezing the accounts and resetting the password. Additionally, the trigger plan can require two signals for the credit card account before the trigger module can freeze the accounts and reset the password.

In step 430, the trigger module can confirm if it has received two signals relating to the credit card account. If the trigger module can confirm that it has received two signals, the trigger module advances to step 440. Otherwise, the trigger module returns to the step 410.

In step 440, the trigger module transmits a text message to the user. If the trigger module receives a response from the user confirming the transaction, the trigger module ends this process by advancing to step 460. Otherwise, the trigger module will advance to step 450, e.g., if after 10 minutes the trigger module does not receive a response from the user, the trigger module will advance to step 450.

In step 450, the trigger module will execute the actions listed in the trigger plan. In this example, the trigger module will freeze the credit accounts and reset the password for the email account. The trigger module can effectuate these actions by, e.g., transmitting signals to the servers associated with these accounts.

In one example embodiment, the trigger module can execute a trigger plan by transmitting a signal to a server hosting the electronic account or associated with the electronic account. For example, the trigger module can transmit a message to an email service provider indicating that one or more emails serviced by the email service provider is hacked. The message can request that the password for the email account be reset. Upon receiving this message, the email service provider can reset the password for the identified email accounts.

As another example, the trigger module can transmit a message to a bank server indicating that fraudulent transactions are detected in connection with a user's credit card, e.g., the user has received emails for transactions that are out of character for the user. The message can ask the bank server to freeze the user's account. The message can include the name and account number of the user. Upon receiving this message, the bank can freeze the user's account.

In one example embodiment, the trigger module can transmit a message to a plurality of service providers to simultaneously freeze, suspend or cancel the accounts. For example, a trigger module can transmit several messages to a plurality of banks to freeze several of a user's credit cards in response to detecting a fraudulent transaction on one of the user's credit card accounts.

In one example embodiment, the trigger module can transmit a message to a bank server to delay a future transaction requested by a user's credit card account. For example, in response to detecting a fraudulent transaction on a credit card account, the trigger module can transmit a message to all of the user's banks to delay all future transactions and contact the police when a transaction is requested on any of the cards.

In one example embodiment, the trigger module can send an API call to a server of each of a plurality of service providers to simultaneously cancel or freeze accounts and reset passwords. For example, a trigger module can transmit several API calls to a plurality of social media servers to reset the passwords for a user's social media accounts in response to detecting spamming activity on one of the user's email accounts.

Figure 5:
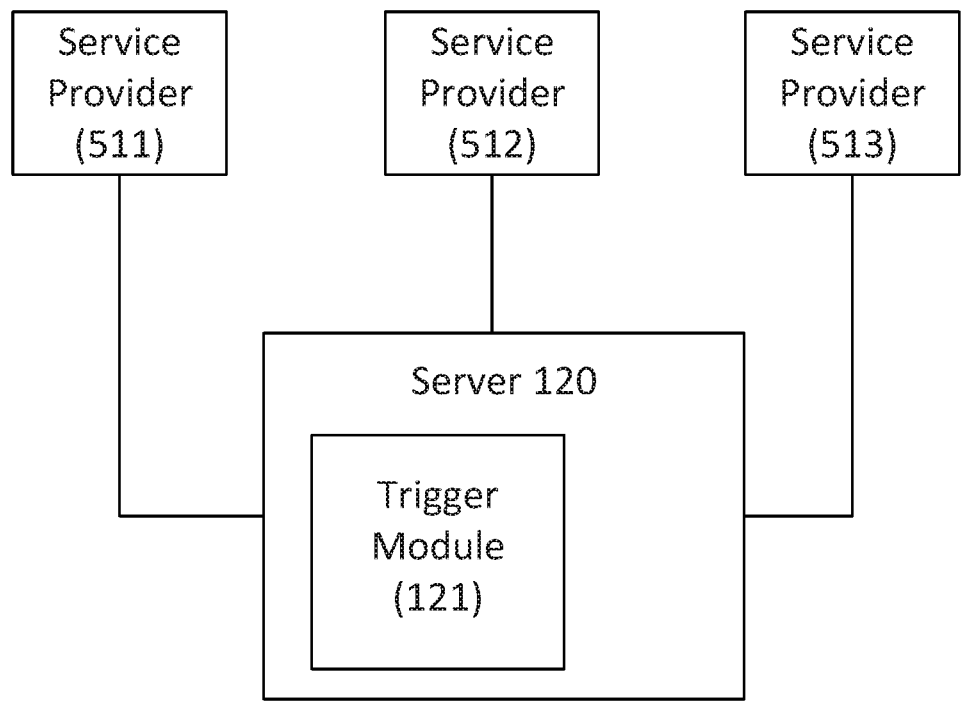
FIG. 5 shows an example system for contacting a service provider using a trigger module.

FIG. 5 shows an example system for contacting a service provider using a trigger module. In this example embodiment, the trigger module 121 is hosted on server 120. Upon receiving a signal, the trigger module can contact a plurality of service providers 511-513. These service providers can be email service providers, social media platforms, banks, phone companies, etc.

Figure 6:
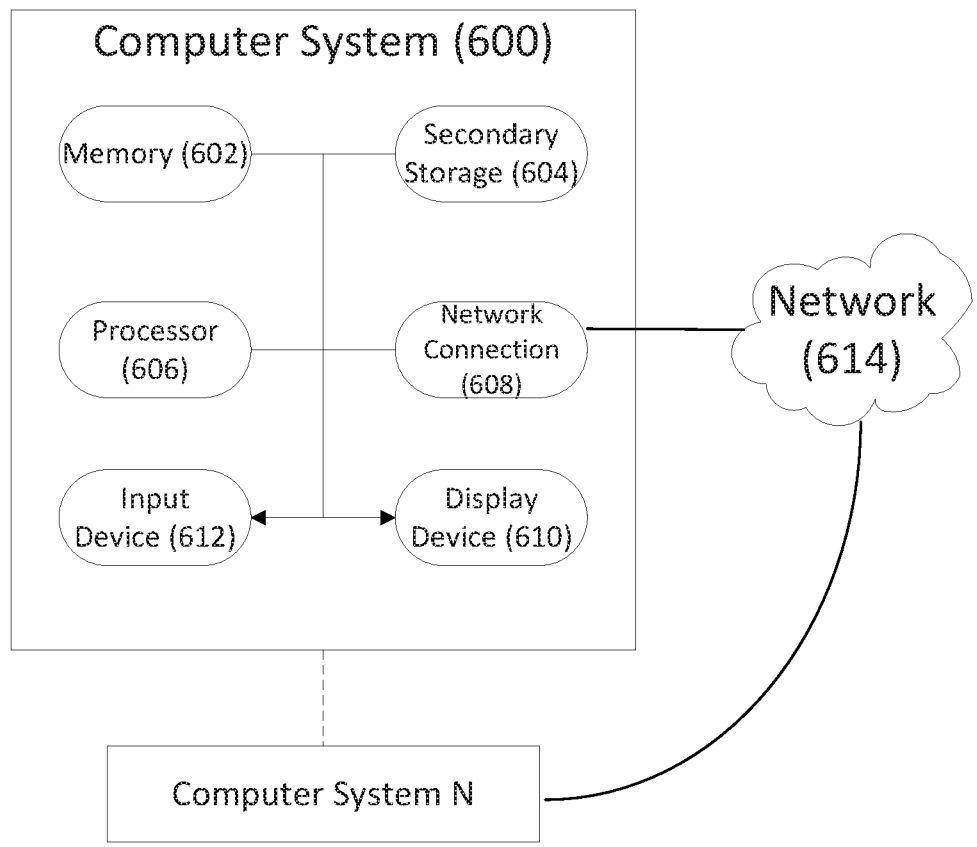
FIG. 6 illustrates exemplary hardware components for a server.

FIG. 6 illustrates exemplary hardware components of a server. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

In an example embodiment, a method for providing email security according to the present disclosure can comprise receiving, from a first email server at a central server including a processor, a memory and a transceiver, a feed including at least one email sent from or received in an email account hosted on the first email server, wherein the email account is associated with a unique identifier; classifying, using a machine learning algorithm executed by the processor of the central server, one or more of the emails as belonging to a first class of emails; and transmitting, using the transceiver of the central server, an alarm signal to a plurality of email servers based on the classification of the one or more emails to the first class of emails, wherein: the alarm signal includes the unique identifier; and the alarm signal includes instructions configured to cause each of the plurality of email servers to take an action with respect to at least one email account which is hosted on the respective email server and associated with the unique identifier. The method can further comprise transmitting, using the transceiver of the central server, the alarm signal to a third-party server based on the classification of the one or more emails to the first class of emails, wherein the alarm signal includes instructions configured to cause the third-party server to take the action with respect to an account. The action can be canceling the at least one email account which is hosted on the respective email server, suspending the at least one email account which is hosted on the respective email server or resetting a password for the at least one email account which is hosted on the respective email server.

In some examples, the unique identifier can be a name or a cellphone number. The account can be a social media account, a credit card account, or a bank account.

In some examples, in classifying the one or more emails, the machine learning algorithm can be configured to evaluate a transmission time, a content of the one or more emails, an email address included in the one or more emails, an IP address from which the one or more emails were transmitted, or a location from which the email account was accessed. The machine learning algorithm can be trained using labeled data. The labeled data can include a plurality of emails and data associated with each respective email and the data can include an indication of whether the respective email belongs to the first class. The first class can indicate whether the respective email was transmitted by an unauthorized user. The data can include a transmission time for the respective email, a content of the respective email, an email address included in the respective email, an IP address from which the respective email was transmitted, or a location from which the respective email was transmitted.

In an example embodiment, a method for providing email security according to the present disclosure can comprise accessing, at an email server including a processor, a memory and a transceiver, at least one email sent from or received in an email account hosted on the email server, wherein the email account is associated with a unique identifier; classifying, using a machine learning algorithm executed by the processor of the email server, one or more of the emails as belonging to a first class of emails; and transmitting, using the transceiver of the email server, an alarm signal to a server based on the classification of the one or more emails to the first class of emails, wherein: the alarm signal includes the unique identifier; and the alarm signal includes instructions configured to cause the server to take an action with respect to a plurality of accounts which is associated with the unique identifier. In some examples, the action can be canceling the credit card account or freezing the credit card account.

In some examples, each of the plurality of the accounts can be a credit card account or a bank account. The unique identifier can be a name or a social security number.

In some examples, in classifying the one or more emails, the machine learning algorithm can be configured to evaluate a transaction amount or an email subject line. The machine learning algorithm can be trained using labeled data. The labeled data can include a plurality of emails and data associated with each respective email and the data can include an indication of whether the respective email belongs to the first class. The data can include a transaction amount and an email subject line. The first class can indicate fraud on a credit card. The first class can indicate an irregular transaction.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:

receiving, from a first email server at a central server including a processor, a memory and a transceiver, a feed including at least one email sent from or received in an email account hosted on the first email server, wherein the email account is associated with a unique identifier;

classifying, using a machine learning algorithm executed by the processor of the central server, one or more of the emails as belonging to a first class of emails, wherein the machine learning algorithm is trained using labeled data, the labeled data includes a plurality of emails and data associated with each respective email, and the data includes an indication of whether the respective email belongs to the first class; and transmitting, using the transceiver of the central server, an alarm signal to a plurality of email servers based on the classification of the one or more emails to the first class of emails, wherein:

the alarm signal includes the unique identifier, and the alarm signal includes instructions configured to cause each of the plurality of email servers to take an action with respect to at least one email account which is hosted on the respective email server and associated with the unique identifier.

2. The method of claim 1, wherein the unique identifier is a name or a cellphone number.

3. The method of claim 1, wherein, in classifying the one or more emails, the machine learning algorithm is configured to evaluate a transmission time, a content of the one or more emails, an email address included in the one or more emails, an IP address from which the one or more emails were transmitted, or a location from which the email account was accessed.

4. The method of claim 1, wherein the first class indicates whether the respective email was transmitted by an unauthorized user.

5. The method of claim 1, wherein the data includes a transmission time for the respective email, a content of the respective email, an email address included in the respective email, an IP address from which the respective email was transmitted, or a location from which the respective email was transmitted.

6. The method of claim 5, wherein the action is canceling the at least one email account which is hosted on the respective email server, suspending the at least one email account which is hosted on the respective email server or resetting a password for the at least one email account which is hosted on the respective email server.

7. The method of claim 5, further comprising transmitting, using the transceiver of the central server, the alarm signal to a third-party server based on the classification of the one or more emails to the first class of emails, wherein the alarm signal includes instructions configured to cause the third-party server to take the action with respect to an account.

8. The method of claim 7, wherein the account is a social media account, a credit card account, or a bank account.

9. A method comprising:

accessing, at an email server including a processor, a memory and a transceiver, at least one email sent from or received in an email account hosted on the email server, wherein the email account is associated with a unique identifier;

classifying, using a machine learning algorithm executed by the processor of the email server, one or more of the emails as belonging to a first class of emails, wherein the machine learning algorithm is trained using labeled data, the labeled data includes a plurality of emails and data associated with each respective email, and the data includes an indication of whether the respective email belongs to the first class; and transmitting, using the transceiver of the email server, an alarm signal to a server based on the classification of the one or more emails to the first class of emails, wherein:

the alarm signal includes the unique identifier, and the alarm signal includes instructions configured to cause the server to take an action with respect to a plurality of accounts which is associated with the unique identifier.

10. The method of claim 9, wherein each of the plurality of the accounts is a credit card account or a bank account.

11. The method of claim 9, wherein the action is canceling the credit card account or freezing the credit card account.

12. The method of claim 9, wherein the unique identifier is a name or a social security number.

13. The method of claim 9, wherein, in classifying the one or more emails, the machine learning algorithm is configured to evaluate a transaction amount or an email subject line.

14. The method of claim 9, wherein the first class indicates fraud on a credit card.

15. The method of claim 9, wherein the first class indicates an irregular transaction.

16. The method of claim 9, wherein the data includes a transaction amount and an email subject line.

17. A server, comprising:

processor;

a memory; and a transceiver, wherein the processor is configured to:

receive, from a first email server via the transceiver, a feed including at least one email sent from or received in an email account hosted on the first email server, wherein the email account is associated with a unique identifier, classify, using a machine learning algorithm, one or more of the emails as belonging to a first class of emails, wherein:

the machine learning algorithm is trained using labeled data, the labeled data includes a plurality of emails and data associated with each respective email, and the data includes an indication of whether the respective email belongs to the first class; and transmit, via the transceiver, an alarm signal to a plurality of email servers based on the classification of the one or more emails to the first class of emails, wherein:

the alarm signal includes the unique identifier, and the alarm signal includes instructions configured to cause each of the plurality of email servers to take an action with respect to at least one email account which is hosted on the respective email server and associated with the unique identifier.

18. The server of claim 17, wherein the action is canceling the credit card account.

19. The server of claim 18, wherein the action further includes freezing a related account.

20. The server of claim 19, wherein the action further includes requiring a reset of a password.

* * * * *